United States Patent
Sim et al.

(10) Patent No.: US 12,544,979 B2
(45) Date of Patent: Feb. 10, 2026

(54) POST-CURING METHOD OF 3D PRINTOUT, AND TRANSPARENT ORTHODONTIC APPLIANCE MANUFACTURED THEREBY

(71) Applicant: Graphy Inc., Seoul (KR)

(72) Inventors: Un Seob Sim, Seoul (KR); Hoon Kim, Seoul (KR)

(73) Assignee: Graphy Inc., Seoul (KR)

( * ) Notice: Subject to any disclaimer, the term of this patent is extended or adjusted under 35 U.S.C. 154(b) by 63 days.

(21) Appl. No.: 18/287,935

(22) PCT Filed: Jul. 8, 2021

(86) PCT No.: PCT/KR2021/008688
§ 371 (c)(1),
(2) Date: Oct. 23, 2023

(87) PCT Pub. No.: WO2022/225097
PCT Pub. Date: Oct. 27, 2022

(65) Prior Publication Data
US 2024/0208148 A1    Jun. 27, 2024

(30) Foreign Application Priority Data
Apr. 22, 2021 (KR) .................. 10-2021-0052197

(51) Int. Cl.
*B29C 64/371* (2017.01)
*A61C 7/08* (2006.01)
(Continued)

(52) U.S. Cl.
CPC ........... *B29C 64/371* (2017.08); *A61C 7/08* (2013.01); *B29C 64/35* (2017.08);
(Continued)

(58) Field of Classification Search
CPC .............. B29C 71/0009; B29C 71/009; B29C 2071/0027; B29C 2071/0045
See application file for complete search history.

(56) References Cited

U.S. PATENT DOCUMENTS 11,104,758 B2 *  8/2021  Klun ..................... B33Y 70/00
11,225,535 B2 *  1/2022  Klun ..................... A61K 6/887
(Continued)

FOREIGN PATENT DOCUMENTS

EP          3702052 A1    9/2020
JP       2009-520569 A    5/2009
(Continued)

OTHER PUBLICATIONS

Philippe Fageot, "European Search Report for EP Application No. 21938014.4", Mar. 11, 2025, EPO, Germany.

*Primary Examiner* — Timothy Kennedy
(74) *Attorney, Agent, or Firm* — Bridgeway IP Law Group, PLLC; Jihun Kim

(57) ABSTRACT

A method for post-curing a 3D printing output and a transparent orthodontic device manufactured by the method are described. The method for post-curing a 3D printing output removes residual resin from printouts manufactured through a 3D printer, shortens the curing time by improving the curing speed through a post-curing process, and can manufacture printouts with improved strength and increased transparency. The transparent orthodontic device removes resin of the surface through the post-curing process when manufacturing a transparent orthodontic device, improves strength, not only has excellent transparency, but also enables unreacted monomers to be removed, and can exhibit shape memory characteristics that restore its shape to the initially printed-out shape of the transparent orthodontic device by the provision of heat.

6 Claims, 4 Drawing Sheets

(51) Int. Cl.
 *B29C 64/35* (2017.01)
 *B29C 71/00* (2006.01)
 *B29C 71/02* (2006.01)
 *B33Y 10/00* (2015.01)
 *B33Y 40/20* (2020.01)
 *B33Y 80/00* (2015.01)

(52) U.S. Cl.
 CPC ........ *B29C 71/0009* (2013.01); *B29C 71/009* (2013.01); *B29C 71/02* (2013.01); *B29C 2071/0027* (2013.01); *B29C 2071/0045* (2013.01); *B33Y 10/00* (2014.12); *B33Y 40/20* (2020.01); *B33Y 80/00* (2014.12)

(56) References Cited

U.S. PATENT DOCUMENTS

| | | | | |
|---|---|---|---|---|
| 11,590,706 | B2 * | 2/2023 | Dias | B29C 64/124 |
| 11,660,814 | B2 * | 5/2023 | Van Esbroeck | B29C 64/35 |
| | | | | 264/401 |
| 11,708,428 | B2 * | 7/2023 | Klun | C08F 2/44 |
| | | | | 522/63 |
| 11,969,942 | B2 * | 4/2024 | Schmidt | B29C 64/264 |
| 11,981,078 | B2 * | 5/2024 | Van Esbroeck | B29C 64/379 |
| 12,268,567 | B2 * | 4/2025 | Schmid | B29C 71/04 |
| 2021/0095056 | A1 * | 4/2021 | Klun | B33Y 10/00 |
| 2021/0163664 | A1 * | 6/2021 | Klun | C08G 18/3206 |
| 2021/0301042 | A1 * | 9/2021 | Klun | C08G 18/44 |
| 2021/0323233 | A1 * | 10/2021 | Dias | B33Y 80/00 |
| 2022/0134657 | A1 * | 5/2022 | Schmidt | B29C 71/04 |
| | | | | 264/401 |
| 2022/0273409 | A1 * | 9/2022 | Schmid | A61C 19/003 |
| 2023/0322966 | A1 * | 10/2023 | Klun | C08F 2/44 |
| | | | | 522/63 |

FOREIGN PATENT DOCUMENTS

| | | | | |
|---|---|---|---|---|
| JP | 2011-520655 | A | 7/2011 | |
| JP | 2018-524288 | A | 8/2018 | |
| KR | 10-2006-0118764 | A | 11/2006 | |
| KR | 10-2008-0096171 | A | 10/2008 | |
| KR | 10-2018-0010293 | A | 1/2018 | |
| KR | 10-1934782 | B1 | 1/2019 | |
| KR | 10-2019-0054856 | A | 5/2019 | |
| KR | 10-2273407 | B1 | 7/2021 | |
| WO | WO-2020003197 | A2 * | 1/2020 | ......... A61C 13/0019 |
| WO | 2021/048733 | A1 | 3/2021 | |

\* cited by examiner

POST-CURING METHOD OF 3D PRINTOUT, AND TRANSPARENT ORTHODONTIC APPLIANCE MANUFACTURED THEREBY

TECHNICAL FIELD

The present invention relates to a method for post-curing a 3D printing output and a transparent orthodontic device manufactured by the method, and specifically, to a method for post-curing that can improve the quality of a product by post-curing a printout printed out through a 3D printer and a transparent orthodontic device manufactured by the method.

BACKGROUND ART

In general, in order to manufacture molded products with a three-dimensional solid shape, there are methods such as a mock-up manufacturing method performed by manual operation by relying on drawings, an automatic manufacturing method with numerical control by using CNC machine, and etc.

However, since the mock-up manufacturing method is performed by manual operation, it is difficult to process precise shapes and takes a lot of time, and the manufacturing method using the CNC machine tools enables sophisticated numerical control, but there are restrictions on the shapes that can be processed due to tool interference.

Accordingly, 3D printing technology has recently emerged where manufactures molded products with a three-dimensional solid shape using a computer that stores 3D design drawing data designed by a product designer or engineer through a three-dimensional modeling tool.

When using the 3D printer, there are advantages in that manufacturing costs and manufacturing times can be significantly reduced, personalized manufacturing is possible, and complex solid shapes can also be easily manufactured.

The above-mentioned 3D printer includes a stereo lithography apparatus (SLA) method, which injects a laser into a photocurable resin to harden the scanned portion, and a digital light processing (DLP) method, which irradiates light to the lower part of a storage tank where the photocurable resin is stored and hardens it, an LCD method, which laminates resin molded products on the top of the build plate using a UV light source and an LCD panel, a selective laser sintering (SLS) method, which sinters the resin molded products using functional polymers or metal powders, a fused deposition modeling (FDM) method, which extrudes and molds molten resin, a laser-aid direct metal tooling (DMT) method, which directly forms metal with a high-power laser beam, and a laminated object manufacturing (LOM) method, which is a mechanical joint molding method.

Among these, in the SLA, DLP, and LCD methods that use the photocurable resin, the desired strength and color can be obtained only by manufacturing the molded products, washing them, and then going through a separate curing process.

A device used in the above-mentioned post-curing process is generally called a 'post-curing machine', and the post-curing machine includes an ultraviolet (UV) post-curing machine, an UV light emitting diode (LED), post-curing machine etc.

If a printout is cured in natural conditions without using a post-curing machine, problems, such as changed dimensions or decreased strength, may occur.

In addition, when a 3D printer cures the printout using only the printer's light source, many problems may occur, such as the size of the printout being changed, its strength being lowered, stickiness due to unreacted photocuring resin after washing, etc.

In order to prevent these problems, a post-curing machine is used, but when only simple UV curing is performed, there is a problem in that the strength and transparency of the printout cannot be improved.

In addition, in order to proceed with the post-curing process, there was the cumbersomeness of requiring the user to directly remove the washing material remaining on the printout before using the post-curing machine.

Development of post-processes for preventing these problems is necessary.

RELATED ART DOCUMENT (Patent Document)
(Patent Document 1) KR 10-2019-0054856 A1

DISCLOSURE

Technical Problem

An object of the present invention is to provide a method for post-curing a 3D printing output and a transparent orthodontic device manufactured by the method.

Another object of the present invention is to provide a process for post-curing a 3D printing output, which removes residual resin from printouts manufactured through a 3D printer, shortens the curing time by improving the curing speed through a post-curing process, and can manufacture printouts with improved strength and increased transparency, and a device for the same.

Still another object of the present invention is to provide a transparent orthodontic device which removes resin of the surface through the post-curing process when manufacturing a transparent orthodontic device, improves strength, not only has excellent transparency, but also enables unreacted monomers to be removed, and exhibits shape memory characteristics that restore its shape to the initially printed-out shape of the transparent orthodontic device by the provision of heat.

Technical Solution

In order to achieve the above object, a method for post-curing a 3D printing output according to one embodiment of the present invention may include steps of: 1) putting a printout using a 3D printer into a rotating body and removing the resin residuals; 2) performing primary post-curing of the printout in an inert gas environment; 3) immersing the primary post-cured printout in oils and then performing secondary post-curing; and 4) treating the secondary post-cured printout with boiling water.

The 3D printer may be a 3D printer of a DLP method, a SLA method, or a LCD method.

The step 1) may be to remove any residual resin remaining on the printout.

The inert gas in the step 2) may be selected from the group consisting of nitrogen, argon, helium, krypton, neon, and mixtures thereof.

Oils in the step 3) may be selected from the group consisting of glycerol, edible oil, castor oil, non-reactive silicone oil, and mixtures thereof.

The step 4) may be to treat the secondary post-cured printout with hot water at 80 to 100° C.

A transparent orthodontic device according to another embodiment of the present invention may be manufactured by the method for post-curing a 3D printing output.

Advantageous Effects

The method for post-curing a 3D printing output according to the present invention removes residual resin from printouts manufactured through a 3D printer, shortens the curing time by improving the curing speed through a post-curing process, and can improve strength and increase transparency of the manufacture.

Further, the transparent orthodontic device according to the present invention removes resin of the surface through the post-curing process when manufacturing a transparent orthodontic device, improves strength, not only has excellent transparency, but also enables unreacted monomers to be removed, and can exhibit shape memory characteristics that restore its shape to the initially printed-out shape of the transparent orthodontic device by the provision of heat.

BEST MODE

Figure 1:
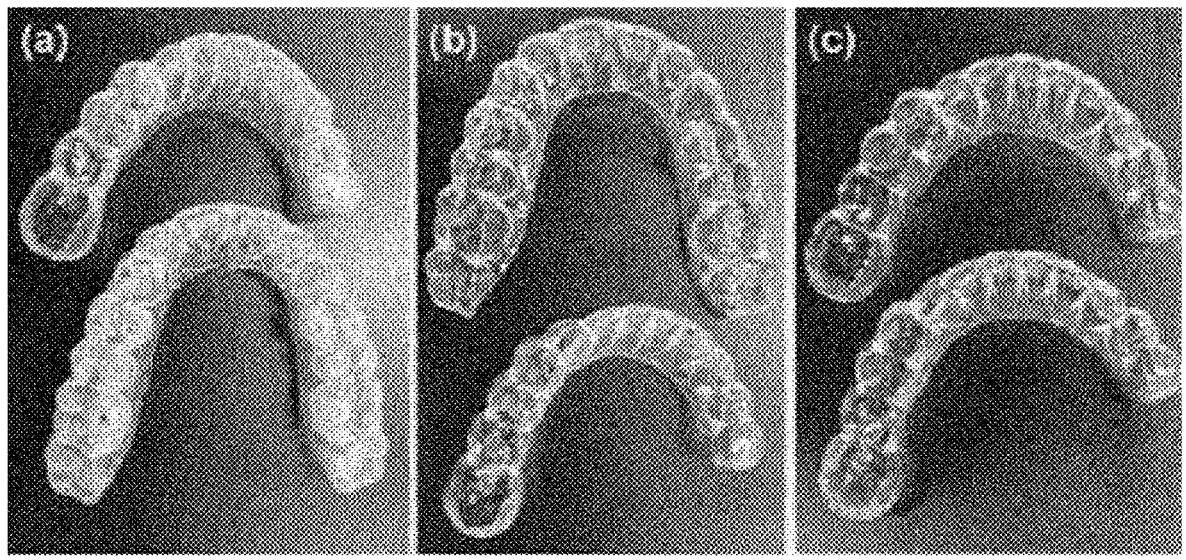
FIG. 1 shows results of a transparency comparison experiment for a transparent orthodontic device according to one embodiment of the present invention.

The present invention relates to a method for post-curing a 3D printing output, including steps of: 1) putting a printout using a 3D printer into a rotating body and removing the resin residuals on the printout; 2) performing primary post-curing of the printout in an inert gas environment; 3) immersing the primary post-cured printout in oils and then performing secondary post-curing; and 4) treating the secondary post-cured printout with boiling water.

MODE FOR INVENTION

Hereinafter, embodiments of the present invention will be described in detail so that they can be easily carried out by those skilled in the art to which the present invention pertains. However, the present invention may be embodied in various different forms and is not limited to the embodiments described herein.

The digital light processing (DLP) method according to the present invention uses the principle of irradiating light to the lower part of the storage tank where the photocurable resin is stored to cure only the part irradiated with light, and the stereo lithography apparatus (SLA) method uses the principle of scanning a laser light on the photocurable resin to cure the scanned portion.

In the case of the DLP method and the SLA method, light is irradiated to a photocurable polymer resin, and the photocurable polymer resin is cured by light irradiation to manufacture a printout.

As the printout is manufactured by curing the photocurable polymer resin, when the printout is manufactured using a 3D printer, resin remains on the appearance of the printout, and protruding surfaces, etc. remain on the surface thereof so that post-processing to keep the surface smooth and clean is additionally required.

Conventionally, in order to proceed with such a post-process, the user directly removed the protruding surfaces using a tool and simultaneously proceeded with a resin removal operation using a solvent.

As the user proceeds with the operation himself or herself, such a process itself not only has a cumbersome problem, but also has a problem of having a difficult perfect operation.

In addition, the printout obtained by curing the photocurable polymer resin contains unreacted polymer resin that is not completely cured during the process of manufacturing it into the printout, and due to this, there is a problem in that the physical properties are deteriorated, or the transparency is low. In order to improve the above problem, a post-curing process is essentially performed.

Previously, the post-curing method was just an extent that the user removes the protruding surfaces of the surface using a tool or removes the resin using a solvent.

In other words, no separate post-curing method for strengthening the physical characteristics of the printout or improving transparency was introduced.

A method for post-curing a 3D printing output according to one embodiment of the present invention may include steps of: 1) putting a printout using a 3D printer into a rotating body and removing the resin residuals; 2) performing primary post-curing of the printout in an inert gas environment; 3) immersing the primary post-cured printout in oils and then performing secondary post-curing; and 4) treating the secondary post-cured printout with boiling water.

The step 1) is to remove any protruding surfaces or remaining resin on the surface of the printout.

Specifically, a process of putting the printout into a cylindrical rotating body and removing the remaining resin is performed. More specifically, the cylindrical rotating body is a dehydrator, but it is not limited to the above example, and any device capable of removing the resin remaining in the printout by rotating force can be used.

If the residual removing process is performed using the device as described above, not only can the resin be easily removed, but also protruding parts formed on the surface can be easily removed.

The dehydrator is a device that includes a cylindrical dehydration unit, and when the dehydration unit rotates in a certain direction, centrifugal force due to the rotation of the dehydration unit is applied to the printout contained therein, enabling resin removal.

The resin can be easily removed due to residual polymers coated on the surface, and even in the case of the protruding surfaces, it can be easily removed by friction with the dehydration unit.

Through such a process, it is possible to easily remove the resin and enable processing of the surface.

The step after the step 1) is a step of performing post-curing, and is proceeded in the order of the step of performing primary post-curing and the step of performing secondary post-curing.

Specifically, the step 2) of performing primary post-curing in an inert gas environment may prevent deformation of the printout by irradiating UV to the 3D printing output and promoting curing and may prevent damage due to external force by improving the strength.

If the curing process is carried out in an inert gas environment, not only does the curing speed of the 3D printing output improve, but its strength also improves so that deformation does not easily occur even under higher levels of impact.

In other words, when the curing process is performed by irradiating UV in an inert gas environment rather than simply irradiating UV to proceed with the curing process, the curing speed may be accelerated by the inert gas and the strength of the printout may be improved. Additionally, if the post-curing process is performed in an inert gas environment, transparency is further improved in the case of a transparent printout.

If the printout is manufactured using a 3D printer of the DLP method or the SLA method, and at this time, a photocurable polymer resin that does not contain dye is used, a transparent printout is obtained.

As previously explained, when a printout is manufactured using a 3D printer of the DLP method or the SLA method, unreacted polymer resin remains in the printout. The unreacted polymer resin is in a state that requires additional curing and is subjected to a post-curing process. However, when the printout is exposed to the atmosphere during the process of carrying out the post-curing process, a photoinitiator in the printout comes into contact with oxygen and generates radicals, and the photocuring behavior is suppressed by scavenging of the generated radicals.

In other words, accordingly, it is necessary to prevent the printout from coming into contact with oxygen. To this end, when proceeding with a primary post-curing process in the present invention, post-curing is performed and thus contact with oxygen is blocked by irradiating UV in an inert gas environment.

When the transparent printout proceeds up to the post-curing process, it takes on a slightly yellow color so that it may be said to be difficult to manufacture a completely transparent printout.

In particular, in the case of an orthodontic device that is used by inserting it onto teeth, such as a transparent orthodontic device, only when transparency should be excellent, the appearance is not significantly affected.

When the transparent orthodontic device is manufactured as a personalized printout using a 3D printer and used as an orthodontic device, if the transparency is not excellent and the slightest yellowish tint appears, since there is a possibility that it may be almost mistaken for poor teeth condition, it may have a negative impact on the user's aesthetics.

In order to prevent such problems, the 3D printing output itself should exhibit a completely transparent extent.

When a printout is manufactured using a conventional printer of the DLP or SLA method, and a product is manufactured by passing it through a post-curing process, some differences may occur depending on the type of photocurable polymer resin, but since it usually has a yellow color, it is not possible to provide a completely transparent orthodontic device.

On the other hand, in the case of the present invention, when UV is irradiated in an inert environment during the post-curing process, the curing speed is improved, not only the strength is improved, but also the transparency of the printout is improved by UV irradiation.

In other words, using the post-curing process according to the present invention makes it possible to provide a completely transparent orthodontic device.

This means that when a post-curing process is used using UV in an inert gas environment, the production speed of the final product is improved as the curing speed is improved, and the strength is excellent and thus deformation due to external force does not easily occur.

The inert gas in the step 2) is selected from the group consisting of nitrogen, argon, helium, krypton, neon, and mixtures thereof, preferably is nitrogen, but all available gases that are not limited to the above examples and are capable of blocking oxygen contact of the printout with the inert gas can be used without restrictions.

The present invention is characterized in that a secondary post-curing process is performed after the primary post-curing process.

Specifically, the secondary post-curing process is completely immersing the printout on which the primary post-curing process has been performed in oils and then irradiating the printout with UV to post-cure it.

Even if the primary post-curing process is additionally performed in an inert gas environment at room temperature without performing the secondary post-curing process, the shape memory characteristic of the printout is not expressed.

As described later, if a printout is manufactured using the photocurable composition according to the present invention and the post-curing process is performed on the printout according to the above steps, when heat of 60° C. or higher is supplied, it is characterized by exhibiting shape memory characteristics in which the printout is restored to its initially printed-out shape.

However, such shape memory characteristic are expressed by the post-curing process according to the present invention, and the characteristics of the printout are not expressed even in the case where the order is changed in a manner of performing only the primary post-curing process without proceeding with the secondary post-curing process, or performing the secondary post-curing process first, and then performing the primary post-curing process.

The secondary post-curing process according to the present invention is completely immersing the printout that has undergone the primary post-curing process in oils and irradiating UV to perform the post-curing process.

When the printout is immersed in oils and irradiated with UV as described above, high curing density and sufficient heat energy may be supplied to the printout by the post-curing process.

In other words, oxygen may be blocked by immersing the printout in oils, and at the same time, oils may absorb heat energy from UV and uniformly transfer it to the printout. Due to the above characteristics, a uniform temperature may be delivered to the printout in the secondary post-curing process, and the printout may exhibit fluidity characteristics.

The order of the primary post-curing process and the secondary post-curing process is important, and if the processes are performed by changing the order, there is a problem in that oils cause bubbles to form on the surface of the printout, causing curing defects to occur. In order to prevent the above problem, it is preferable to proceed in the order of the post-curing process according to the present invention.

Oils in the step 3) are selected from the group consisting of glycerol, edible oil, castor oil, non-reactive silicone oil, and mixtures thereof, and preferably are glycerol, but all oils that are not limited to the above examples, exhibit non-reactivity with the printout, block contact with oxygen, and absorb heat to enable it to be uniformly transferred to the printout can be used without restrictions.

After the post-curing process, a boiling water treatment process is performed. The step 4) is performing treatment with hot water at 80 to 100° C., and unreacted monomers remaining in the printout may be removed by hot water treatment.

A transparent orthodontic device according to another embodiment of the present invention is manufactured by the method for post-curing a 3D printing output.

The transparent orthodontic device is used in order to correct the positions of teeth to the desired positions of the teeth in a state in which the transparent orthodontic device is inserted onto the patient's teeth.

The transparent orthodontic device according to the present invention is manufactured by the post-curing method described above, and thus may have excellent transparency, have excellent physical properties, and exhibit shape memory characteristics that restore it to the shape initially printed out by heat.

The transparent orthodontic device is printed out with a 3D printer using a photocurable composition, which will be described later, and it is manufactured by the post-curing process.

A photocurable composition for a 3D printer according to one embodiment of the present invention includes: a photocurable oligomer; a reactive monomer; a photoinitiator; and a nanoclay, wherein the nanoclay may strengthen the mechanical properties of the printout printed out by 3D printing due to the interaction of the reactive monomer and electrical attraction.

The nanoclay is characterized by being sepiolite, but all available nanoclays that are not limited to sepiolite, and can strengthen mechanical properties by being included in a photocurable composition for a 3D printer can be used without restrictions.

Polymer composite technology may be applied to overcome the limitations of mechanical strength of 3D printing materials. However, there are some problems in applying the above composite material to 3D printing. The most important problem is the size of an additive used in composite material. As the size of the additive increases, the size of the printing gap also increases so that a problem that the printing resolution is lowered as a result may occur.

In order to prevent the above problem, nano-sized materials may be used as the additive. In the case of graphene, carbon nanotubes (CNTs), etc., which are conventionally known as nano-sized materials, price competitiveness may be a problem. On the other hand, the nanoclays have reasonable prices and are therefore more suitable for industrial applications. Among the nanoclays, sepiolite is a hydrated magnesium silicate with a half-unit cell formula of $Mg_8Si_{12}O_{30}(OH)_4 \cdot 12H_2O$.

Figure 2:
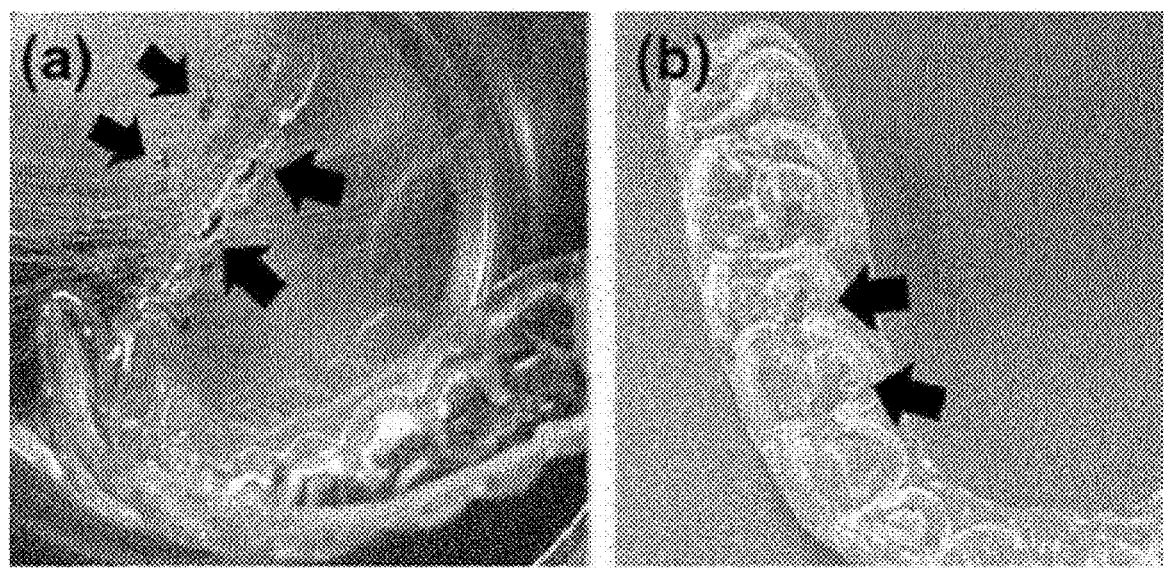
FIG. 2 shows results of an experiment on the generation of bubbles in the transparent orthodontic device according to one embodiment of the present invention.
Figure 3:
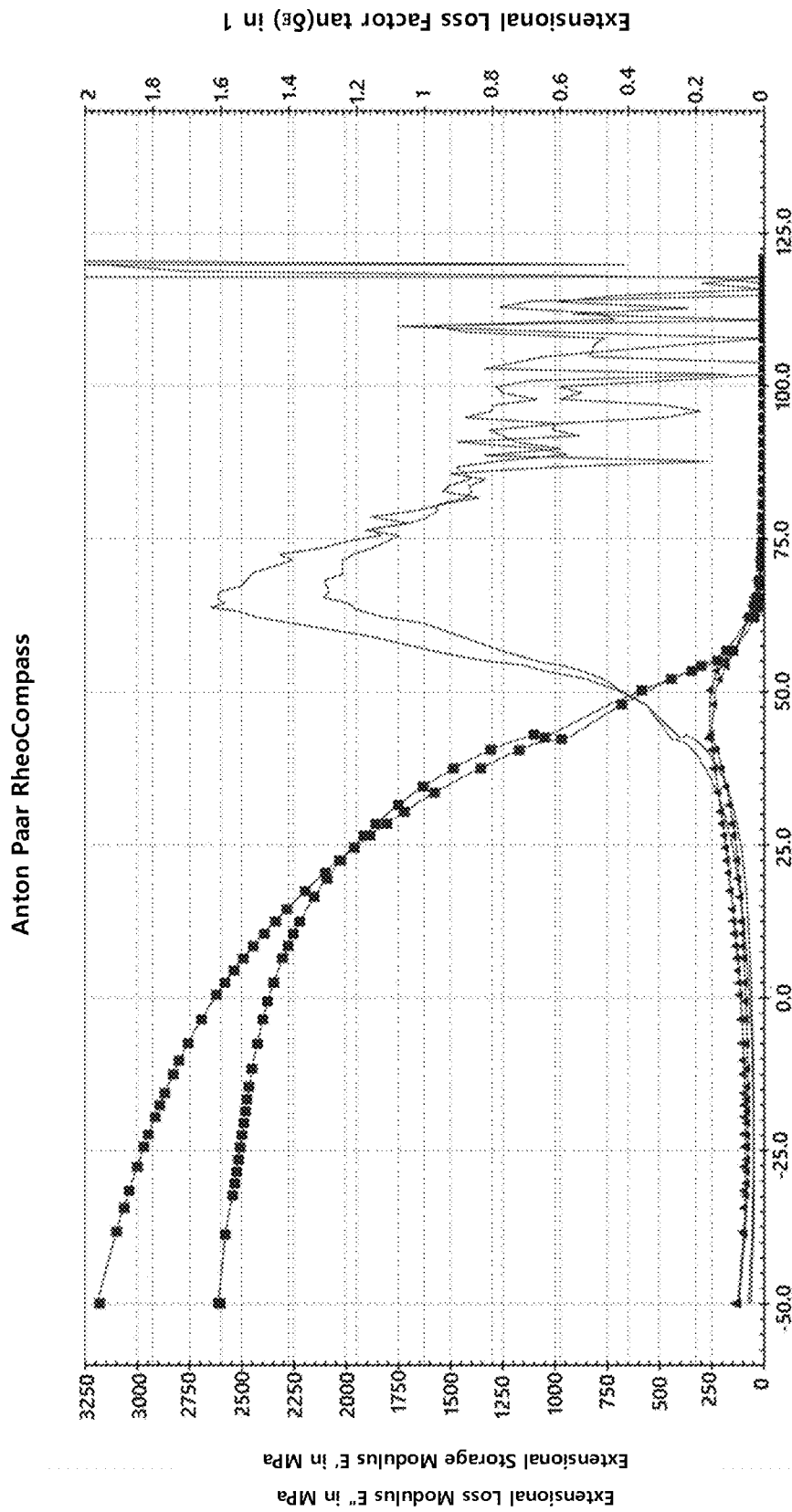
FIG. 3 shows results of changes in loss/storage modulus of the transparent orthodontic device according to one embodiment of the present invention.
Figure 4:
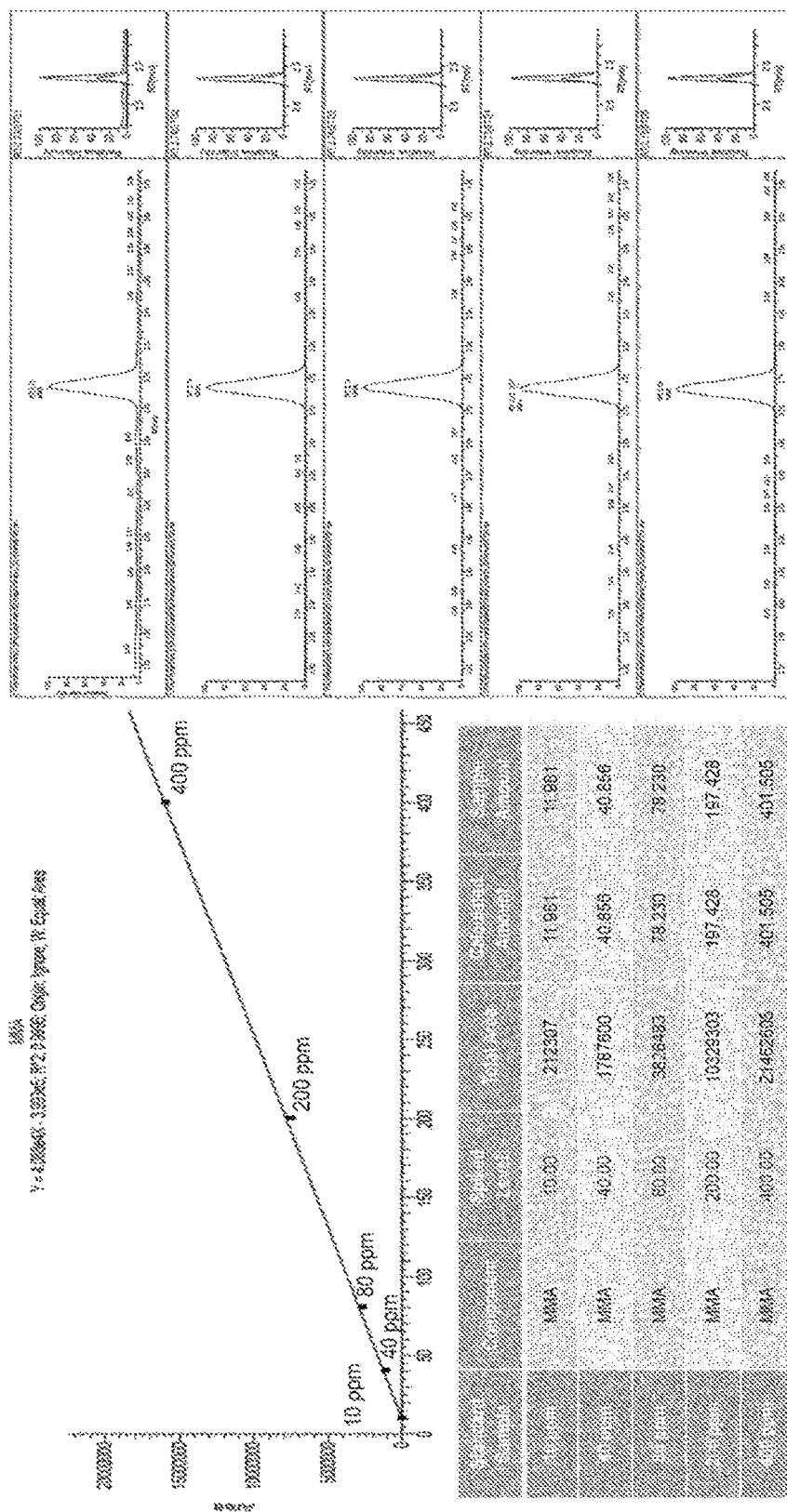
Figure 5:
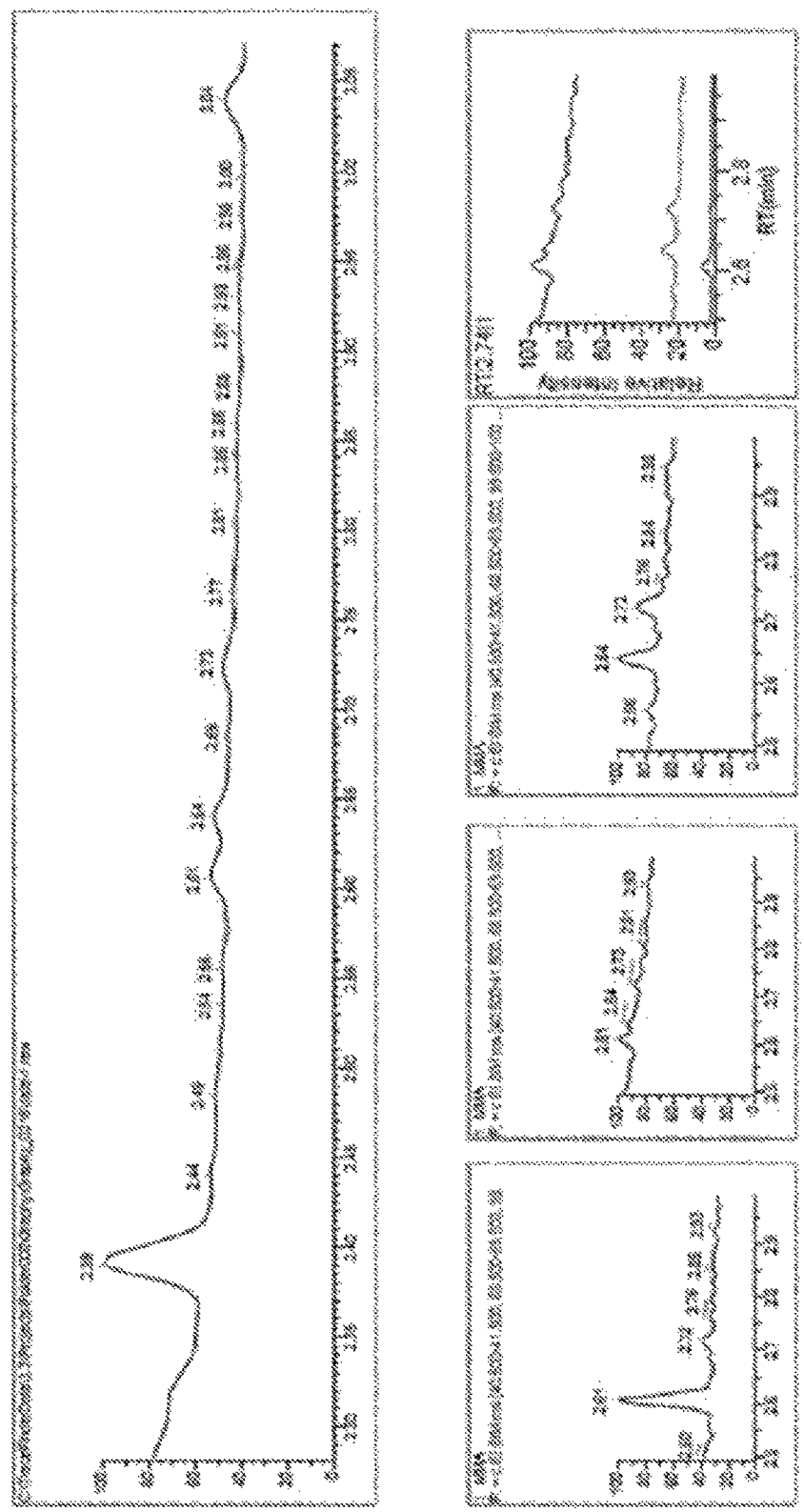

Sepiolite has a cross-sectional chemical structure as shown in FIG. 2 and a lattice crystal form as shown in FIG. 3. More specifically, it is a needle-like or fiber-like form composed of several blocks and tunnels parallel to the fiber direction. Each structural block contains a central octahedral magnesium $(MgOH_6)$ sheet sandwiched between two tetrahedral silica $(SiO_4)$ sheets. A single sepiolite fiber has a length of 0.2 to 4 μm, a width of 10 to 30 nm, and a thickness of 5 to 10 nm.

When sepiolite is included as a nanoclay, it may maintain a viscosity capable of 3D printing in the photocurable composition and exhibit high mechanical strength for the printout printed out.

That is, when a large amount of the nanoclay is included, the viscosity of the photocurable composition increases, and when the viscosity increases, there is a problem in that the composition cannot be manufactured as a printout through a 3D printer. When the nanoclay is included in a certain amount or more, the mechanical strength of the printout may increase, but due to the problem that high viscosity compositions cannot be used for 3D printing, it is preferable that the viscosity of the photocurable composition is also included within a certain range.

Accordingly, the photocurable composition may include 0.5 to 5 parts by weight of the nanoclay and 1 part by weight of the photoinitiator based on 100 parts by weight of a UV resin. The UV resin includes a photocurable oligomer and a reactive oligomer. When mixed and used within the above range, not only can it be manufactured into a printout using a 3D printer, but the manufactured printout can also exhibit excellent mechanical strength. More specifically, the 3D printer is a 3D printer of the DLP method.

The photocurable oligomer may be a compound represented by the following Formula 1:

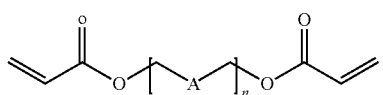

[Formula 1]

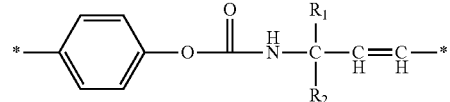

[Formula 2]

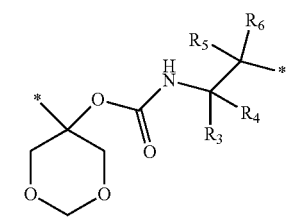

[Formula 3]

where, n is an integer of 1 to 1,000,

A is a compound represented by Formula 2 or Formula 3 above,

* refers to a part that is combined, $R_1$ to $R_6$ are the same as or different from each other and are each independently selected from the group consisting of hydrogen, deuterium, a cyano group, a nitro group, a halogen group, a hydroxy group, a substituted or unsubstituted alkyl group having 1 to 30 carbon atoms, a substituted or unsubstituted cycloalkyl group having 1 to 20 carbon atoms, a substituted or unsubstituted alkenyl group having 2 to 30 carbon atoms, a substituted or unsubstituted alkynyl group having 2 to 24 carbon atoms, a substituted or unsubstituted aralkyl group having 7 to 30 carbon atoms, a substituted or unsubstituted aryl group having 6 to 30 carbon atoms, a substituted or unsubstituted heteroaryl group having 5 to 60 carbon atoms, a substituted or unsubstituted heteroarylalkyl group having 6 to 30 carbon atoms, a substituted or unsubstituted alkoxy group having 1 to 30 carbon atoms, a substituted or unsubstituted alkylamino group having 1 to 30 carbon atoms, a substituted or unsubstituted arylamino group having 6 to 30 carbon atoms, a substituted or unsubstituted aralkylamino group having 6 to 30 carbon atoms, a substituted or unsubstituted heteroarylamino group having 2 to 24 carbon atoms, a substituted or unsubstituted alkylsilyl group having 1 to 30 carbon atoms, a substituted or unsubstituted arylsilyl group having 6 to 30 carbon atoms, and a substituted or unsubstituted aryloxy group having 6 to 30 carbon atoms, The substituted alkylene group, substituted arylene group, substituted heteroarylene group, substituted cycloalkylene group, substituted alkyl group, substituted cycloalkyl group, substituted alkenyl group, substituted alkynyl group, substituted aralkyl group, substituted aryl group, substituted heteroaryl group, substituted heteroarylalkyl group, substituted alkoxy group, substituted alkylamino group, substituted arylamino group, substituted aralkylamino group, substituted heteroarylamino group, substituted alkylsilyl group, substituted arylsilyl group, and substituted aryloxy group are substituted with one or more substituents selected from the group consisting of hydrogen, deuterium, a cyano group, a nitro group, a halogen group, a hydroxy group, an alkyl group having 1 to 30 carbon atoms, a cycloalkyl group having 1 to 20 carbon atoms, an alkenyl group having 2 to 30 carbon atoms, an alkynyl group having 2 to 24 carbon atoms, an aralkyl group having 7 to 30 carbon atoms, an aryl group having 6 to 30 carbon atoms, a heteroaryl group having 5 to 60 carbon atoms, a heteroarylalkyl group having 6 to 30 carbon atoms, an alkoxy group having 1 to 30 carbon atoms, an alkylamino group having 1 to 30 carbon atoms, an arylamino group having 6 to 30 carbon atoms, an aralkylamino group having 6 to 30 carbon atoms, a heteroarylamino group having 2 to 24 carbon atoms, an alkylsilyl group having 1 to 30 carbon atoms, an arylsilyl group having 6 to 30 carbon atoms, and an aryloxy groups having 6 to 30 carbon atoms, and when substituted with multiple substituents, they are the same as or different from each other.

Specifically, $R_1$ to $R_6$ may be the same as or different from each other, and may each independently be selected from the group consisting of hydrogen, deuterium, a hydroxy group, and an alkyl group having 1 to 30 carbon atoms.

More specifically, the photocurable oligomer is a compound represented by Formula 1 above, and A includes both a compound represented by Formula 2 and a compound represented by Formula 3.

More specifically, for UV curing, the photocurable oligomer is a polymer compound to which a photocuring functional group is bonded, includes a double bond structure between carbons, and may exhibit a photocuring action due to the carbon-carbon double bond.

In addition, the photocurable oligomer includes a polyurethane structure as a main chain, a photocuring functional group is bonded to the polyurethane structure, and soft functional groups and hard functional groups are contained in the compound.

The printout exhibits flexible properties due to the soft functional groups included in the photocurable composition, and may also exhibit heat resistance due to the hard functional groups.

In other words, as a photocuring functional group is bonded to the photocurable oligomer, and the soft functional groups and the hard functional groups are used, the photocurable oligomer not only may exhibit a flexible effect by using a carbon skeleton that has soft properties at room temperature, but also may exhibit properties resistant to heat together by using a carbon skeleton having hard properties at room temperature.

As the photocurable oligomer includes a carbon skeleton with hard properties, it has excellent physical properties such as thermal properties, strength, elastic modulus, and tensile elongation, and can manufacture a 3D printing output that can be restored to its original shape by heat.

In addition, as the photocurable oligomer includes a carbon skeleton with soft properties, its shape can be modified by external force after heat is provided.

In general, a composition for a 3D printer includes only a carbon skeleton with hard properties in order to increase the physical properties of the printout, which may increase the physical properties of the printout, but on the contrary, when the shape is deformed by use, there is a problem in that shape restoration is not possible, and thus the composition for a 3D printer cannot be used multiple times.

As the composition for a 3D printer in the present invention includes a carbon skeleton with hard properties and a carbon skeleton with soft properties, it not only has excellent physical properties such as thermal properties, strength, elastic modulus, and tensile elongation, but also may use the flexible nature of the soft functional groups together so that if the shape is deformed by an external force in a state in which heat is provided, the shape may be fixed to the deformed shape, and then when heat is provided again, it can be restored to the original shape.

As will be described later, the photocurable composition for a 3D printer according to the present invention can be used as a transparent orthodontic device, and the transparent orthodontic device is used in order to correct the positions of teeth to the desired positions of the teeth in a state in which the transparent orthodontic device is inserted onto the patient's teeth. Accordingly, a transparent orthodontic device printed out with a 3D printer should exhibit physical properties that will not be damaged with respect to resistance at the current positions of the patient's teeth, and should be able to provide the force capable of moving the teeth to the desired positions for correction. The correction effect and correction principle of the transparent orthodontic device according to the present invention will be described later. However, since the photocurable composition for a 3D printer according to the present invention contains both soft and hard functional groups in the photocurable oligomer, it not only has excellent physical properties, but also enables shape deformation in a heated state. In addition, due to its characteristics enabling restoration to its original shape by heat, it can be manufactured as a transparent orthodontic device with excellent correction power.

In addition, as described above, the photocurable composition further includes a nanoclay so that physical properties may be supplemented to exhibit high correction power.

The reactive monomer is an acrylate-based monomer.

More specifically, the acrylate-based monomer may be selected from the group consisting of a compound represented by the following Formula 4, a compound represented by the following Formula 5, and a mixture thereof:

[Formula 4]

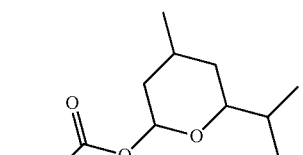

[Formula 5]

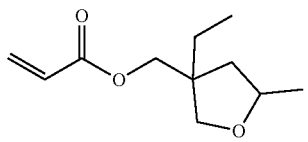

A transparent orthodontic device according to another embodiment of the present invention may include the photocurable composition for a 3D printer.

The transparent orthodontic device according to the present invention is printed out by 3D printed using a photocurable composition, and unlike existing transparent orthodontic devices, it can accurately reproduce even the curved surfaces of teeth, and has excellent correction effect due to its high close adhesion to the teeth.

The transparent orthodontic device according to the present invention is manufactured by obtaining data on the patient's tooth structure and printing out them, and can be manufactured with almost no difference in the deviation from the tooth structure as 50 to 80 μm, whereas the conventional transparent orthodontic device exhibits a deviation from the patient's teeth of 200 to 300 μm so that since it does not adhere closely to the patient's teeth, the correction power is reduced.

The transparent orthodontic device according to the present invention is heated to 40° C. or higher, and then inserted onto the patient's teeth to fix the shape in close contact with the teeth, and the transparent orthodontic device in close contact with the teeth is restored to its original shape by body temperature to correct teeth.

The shape of the transparent orthodontic device according to the present invention can be changed when put into and then removed from heated water. When heat is applied, flexibility appears for a certain period of time, making it possible to change the shape. If the transparent orthodontic device is simply pressed with the hand after taking out and inserting it onto the teeth after immersing the transparent orthodontic device in water at 60 to 100° C. before inserting it onto the patient's teeth using these properties, its shape is changed into a shape that adheres closely to the teeth.

Afterwards, when heat is provided to the transparent orthodontic device by body temperature within the oral cavity, restoration to the originally printed-out form occurs.

That is, if, after immersing it in water at 60 to 100° C., the transparent orthodontic device is inserted onto the teeth and transformed into the same shape as the teeth, the shape of the transparent orthodontic device according to the present invention is changed to match the current patient's tooth structure, and then when heat is provided by body temperature, it is gradually restored to the originally printed-out shape, and at this time, the transparent orthodontic device moves the teeth to the positions for tooth correction by the force of being restored to the original shape.

In other words, a conventional orthodontic device is manufactured as a transparent orthodontic device according to the positions of the teeth to be corrected step by step based on information obtained from the patient's tooth structure, and is then inserted onto the teeth to move the teeth due to the properties of the hard material. As previously explained, the conventional transparent orthodontic device moves the teeth due to the properties of the material, and does not provide uniform force within the teeth, thereby deteriorating the tooth correction effect.

Meanwhile, as described above, the transparent orthodontic device according to the present invention is in a state that is transformed to the same state as the structure of the teeth when the transparent orthodontic device is first used, but when heat is provided by body temperature, the transparent orthodontic device is restored to its original shape, and thus force is transmitted to the teeth. In a point that the force transmitted to the teeth is not a force caused by the material of the orthodontic device, but the force is generated and transmitted by restoration of the shape, a uniform force is provided to the entirety of the teeth, and the teeth may move as a whole.

Manufacturing Example 1

After the monomers represented by Formulas 4 and 5 below were mixed at a weight ratio of 1:1, and sepiolite was added, the mixture was pulverized and dispersed for 1 minute at an output of 750 w using a tip ultrasonication processor. Afterwards, a photocurable oligomer whose fluidity was secured was added by heating the dispersed material in an oven at 60° ° C. for 12 hours. The photocurable oligomer is a compound represented by Formula 1 below, and A includes both a compound represented by Formula 2 and a compound represented by Formula 3, and includes the compound represented by Formula 2 and the compound represented by Formula 3 at a weight ratio of 1:1.5. Afterwards, the photoinitiator represented by Formula 6 below was added, and mixed and defoamed using a paste mixer.

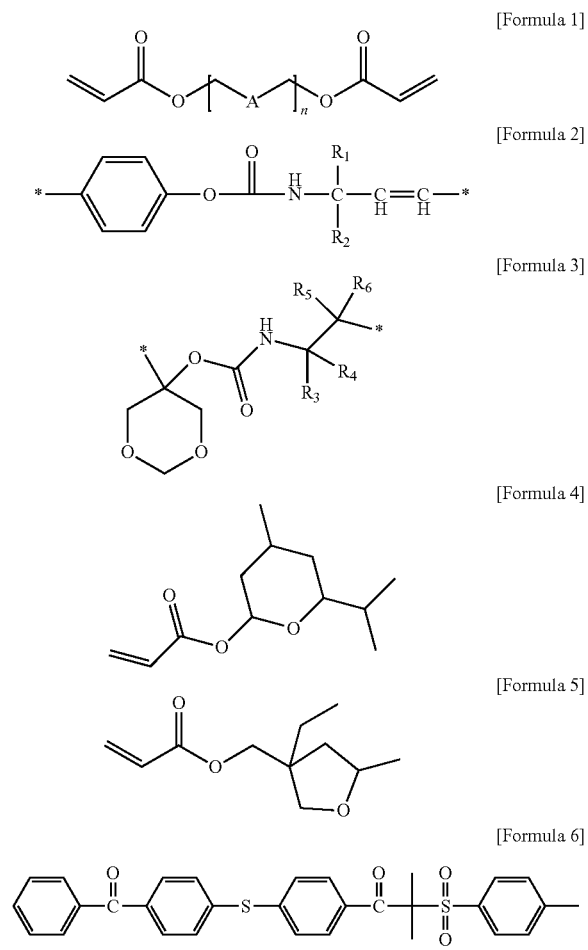

where.

n is an integer of 1 to 1.000.

\* refers to a part that is combined, and $R_1$ to $R_6$ are methyl groups.

The photocurable composition included 1 part by weight of a photoinitiator and 2 parts by weight of sepiolite based on 100 parts by weight of a UV resin. Here, the UV resin includes a photocurable oligomer and a monomer, and A of Formula 1 includes a compound represented by Formula 2, a compound represented by Formula 3, a monomer represented by Formula 4, and a monomer represented by Formula 5 at a weight ratio of 1:1.5:1:1.

Example 1

Manufacturing of Transparent Orthodontic Device

The photocurable composition was put into a 3D printer of a DLP method and printed out with a transparent orthodontic device. The manufactured transparent orthodontic device underwent a post-curing process. Specifically, a residual removing process using a dehydrator was equally performed in order to remove the remaining resin and remove the protruding surfaces.

Afterwards, the orthodontic device was put into a box, oxygen was completely blocked under a nitrogen atmosphere, and then UV irradiated for 25 minutes. The orthodontic device was immersed in a bath containing glycerol, and UV was irradiated for 25 minutes to perform a secondary post-curing process. The secondary post-cured orthodontic device was treated with boiling water at 80 to 100° C. to complete the post-curing process.

Comparative Example 1

The transparent orthodontic device was manufactured in the same manner as in Example 1 except that a transparent orthodontic device printed out from a 3D printer of a DLP method was washed using a dehydrator, and the washed transparent orthodontic device was exposed at room temperature (20 to 25° C.) for 50 minutes.

Comparative Example 2

The transparent orthodontic device was manufactured in the same manner as in Example 1 except that a transparent orthodontic device printed out from a 3D printer of a DLP method was washed using a dehydrator, the washed transparent orthodontic device was primarily irradiated with UV under a nitrogen environment for 25 minutes, and it was then irradiated with UV again under the same conditions for 25 minutes.

Comparative Example 3

The transparent orthodontic device was manufactured in the same manner as in Example 1 except that a transparent orthodontic device printed out from a 3D printer of a DLP method was washed using a dehydrator, the washed transparent orthodontic device was immersed in a bath containing glycerol and irradiated with UV for 25 minutes, and it was then irradiated with UV for 25 minutes under a nitrogen environment.

Experimental Example 1

Check Transparency

The transparent orthodontic devices manufactured in Example 1, Comparative Example 1, and Comparative Example 2 above were immersed in a water tank containing water at 37° C. for 24 hours in order to create conditions similar to the use environment in the oral cavity, and then transparency degrees of the transparent orthodontic devices were checked with the naked eye.

The results are as shown in FIG. 1. FIG. 1A is the transparent orthodontic device of Comparative Example 1, FIG. 1B is the transparent orthodontic device of Example 1, and FIG. 1C is the transparent orthodontic device of Comparative Example 2.

FIG. 1B can be confirmed to appear remarkably transparent.

Specifically, photocuring behavior in the atmosphere exposed to air is inhibited by radical scavenging of oxygen. As shown in FIG. 1, it can be confirmed that the transparency degree of the orthodontic device cured in the atmospheric environment is lowered after being immersed for 24 hours. As a result, the surface forms a relatively low cross-linking density and reacts sensitively to moisture, resulting in a problem of lowered transparency.

In addition, in the case of Comparative Example 2, the transparent orthodontic device was subjected to two post-curing processes without immersion in glycerol, which means that as glycerol is used, glycerol absorbs heat energy by UV irradiation and transfers it uniformly into the transparent orthodontic device. Accordingly, high curing density could be exhibited, and results of improving transparency were exhibited.

Experimental Example 2

Whether Surface Bubbles Occur or not

As previously in Comparative Example 3, the experiment results for the case in which the secondary post-curing process is performed before the primary post-curing process by varying the order from that of the post-curing method according to the present invention can be confirmed through FIG. 2.

FIG. 2 relates to the transparent orthodontic device of Comparative Example 3. It can be confirmed that when the curing process is performed after immersion in glycerol without first performing curing under a nitrogen environment, bubbles are generated on the surface.

In other words, nitrogen gas ($N_2$) acts uniformly on the surface of the material in a gaseous state, but oils such as glycerol are high-viscosity fluids and do not have uniform wettability on the surface of the cured product and generate bubbles during the immersion process. As shown in FIG. 2, bubbles generated during the immersion process remain as traces on the surface of the final cured material, and these traces correspond to product defects. On the other hand, the transparent orthodontic device of Example 1 was primarily cured in a nitrogen atmosphere and then immersed in glycerol so that as secondary curing was performed, it was confirmed that no bubbles were generated.

Experimental Example 3

Resilience Assessment

For the transparent orthodontic device of Example 1, the change in loss/storage modulus of the orthodontic device within a temperature range was checked using the dynamic mechanical analysis (DMA) mode of the Anton Paar's MCR 702 of the double cantilever fixture.

The results are as shown in FIG. 3.

The tangent delta value of the orthodontic device shows the highest point around 60° C., which means that it can express shape memory characteristics that return to its original state due to the internal stress generated within the orthodontic device.

That is, the transparent orthodontic device according to the present invention is printed out using the photocurable composition according to the present invention and then manufactured through a curing process. The orthodontic device manufactured by the above manufacturing method has shape memory characteristics that restore its shape to the initially printed-out shape at 60° C. or higher. Such characteristics can be said to be generated due to the characteristics that heat is generated from a light source during the post-curing process and is transferred to the sample, and the heated orthodontic device returns to its cured state at the beginning of printing.

When glycerol, oils, is used in the secondary curing process, glycerol blocks oxygen and at the same time absorbs heat energy and uniformly transfers heat energy to the transparent orthodontic device. The orthodontic device manufactured by the process as described above may exhibit shape memory characteristics due to heat, and such characteristics may display a very excellent effect in increasing the correction power of the transparent orthodontic device.

Experimental Example 4

Whether or not Unreacted Organic Matter is Detected

The transparent orthodontic device of Example 1, as one which is washed by treating it with hot water at 80 to 100° C. for 5 minutes to remove unreacted monomers, conducted an experiment based on ISO 20798-2 using a gas chromatography tandem mass spectrometer.

Although preferred embodiments of the present invention have been described in detail above, the scope of rights of the present invention is not limited thereto, and various modifications and improved forms made by those skilled in the art using the basic concept of the present invention defined in the following claims also fall within the scope of the rights of the present invention.

INDUSTRIAL APPLICABILITY

The present invention relates to a method for post-curing a 3D printing output and a transparent orthodontic device manufactured by the method, and specifically, to a method for post-curing that can improve the quality of a product by post-curing a printout printed out through a 3D printer and a transparent orthodontic device manufactured by the method.

The invention claimed is:

1. A method for post-curing a 3D printing output, comprising steps of:
    putting a printout using a 3D printer into a rotating body and washing the printout;
    performing primary post-curing of the printout in an inert gas environment;
    immersing the primary post-cured printout in oil and then performing secondary post-curing; and
    treating the secondary post-cured printout with boiling water.

2. The method according to claim 1, wherein the 3D printer is a DLP printer, a SLA printer, or a LCD printer.

3. The method according to claim 1, wherein the putting the printout using the 3D printer includes removing any residual resin remaining on the printout.

4. The method according to claim 1, wherein the inert gas in the performing the primary post-curing of the printout is selected from a group consisting of nitrogen, argon, helium, krypton, neon, and mixtures thereof.

5. The method according to claim 1, wherein the oil in the immersing the primary post-cured printout is at least one selected from a group consisting of glycerol, edible oil, castor oil, non-reactive silicone oil, and mixtures thereof.

6. The method according to claim 1, wherein the treating the secondary post-cured printout includes treating the secondary post-cured printout with the boiling water in a range of 80° C. to 100° C.

* * * * *